No. 674,115. Patented May 14, 1901.
C. HEILRATH.
WHEEL RETAINING NUT.
(Application filed Oct. 29, 1900.)
(No Model.)
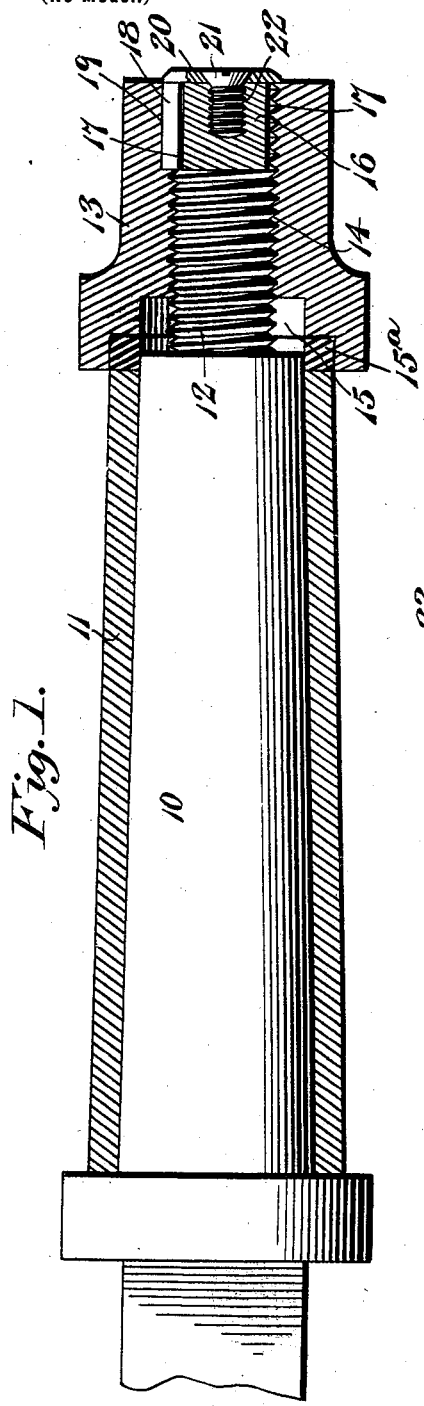
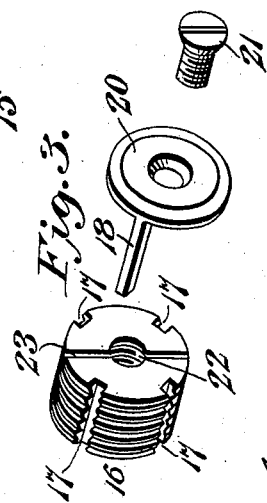
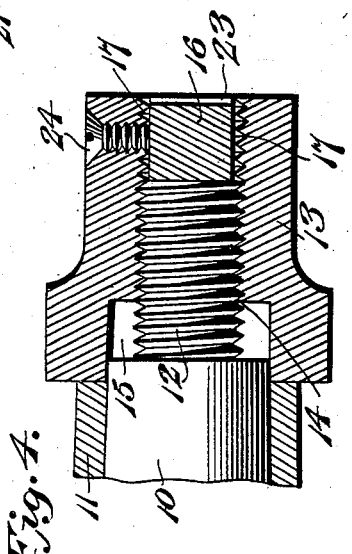
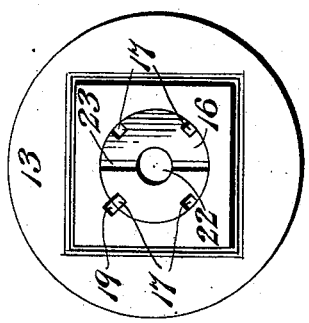
Christian Heilrath Inventor
Witnesses

UNITED STATES PATENT OFFICE.

CHRISTIAN HEILRATH, OF SACRAMENTO, CALIFORNIA.

WHEEL-RETAINING NUT.

SPECIFICATION forming part of Letters Patent No. 674,115, dated May 14, 1901.

Application filed October 29, 1900. Serial No. 34,791. (No model.)

*To all whom it may concern:*

Be it known that I, CHRISTIAN HEILRATH, a citizen of the United States, residing at Sacramento, in the county of Sacramento and State of California, have invented a new and useful Wheel-Retaining Nut, of which the following is a specification.

The present invention relates to wheel-retaining nuts for axles; and the object thereof is to provide a device of this character having locking means whereby the movement of the nut may be limited and set in its operative position, so as to avoid undue friction with the hub and at the same time prevent any longitudinal movement of the same.

It consists, substantially, of a nut having a screw-threaded bore which receives the end of the axle-spindle and is provided with a plug that is arranged to abut against the end of the axle-spindle to limit the movement of the nut upon the same, and locking means carried by the nut and arranged to engage the plug to hold both in relatively fixed position, thus obviating any liability of the nut becoming loosened and turned off the axle.

In order that the invention may be readily understood, the preferred forms of construction have been described in the following specification, taken in connection with the drawings, which form a part of the same, and in which—

Figure 1 is a longitudinal sectional view of a portion of an axle and an axle-box secured in place thereon by the improved nut. Fig. 2 is an end elevation of the same, showing the locking-key and cap removed. Fig. 3 is a detail perspective view of the plug and locking means therefor in separated positions. Fig. 4 is a longitudinal section of a slightly-modified form.

Similar numerals of reference designate corresponding parts in the several figures of the drawings.

In the drawings the numeral 10 indicates an axle-spindle, and 11 the box, both of which may be of any desired construction. The outer end of the axle is provided with the usual screw-threaded extension 12, upon which is screwed the improved nut, (designated by the numeral 13.)

The nut 13 comprises a body which has a central longitudinal screw-threaded bore 14, that receives the extension 12, and a recess 15 in the inner face of said nut and concentric to the bore to receive the end of the axle-spindle, said recess having an enlarged annular portion for the reception of a suitable washer, as 15ª. The bore 14 extends entirely through the nut, being preferably of the same diameter throughout its length, and in the outer end thereof is screwed the plug 16, which thus closes the end of the said bore and is adjustable therein. This plug 16 is cylindrical in form and has a plurality of longitudinal grooves 17 in its outer screw-threaded surface, arranged to receive a locking device to prevent its turning. In the first three figures of the drawings the locking device is in the form of a key 18, which is arranged to be placed in the keyway formed by one of the grooves 17 alining with a similar groove 19 in the outer end of the bore 14, as shown clearly in Fig. 2. In order to hold the key in place, a cap 20 is secured to the outer end of the plug, covering the keyway, and this cap may be either separate from or formed integral with the key 18. It is fastened by means of a screw 21, that screws into the opening 22 in the outer end of the plug, and this end is also provided with a diametrical slot 23, adapted to receive the end of an operating-tool.

In Fig. 4 a slightly-modified form of lock is shown which is especially applicable to nuts of large size. In this form a set-screw 24 is provided in the nut, the inner end of the same being adapted to seat itself in one of the longitudinal slots 17. This form of construction obviates the necessity of the key and cap plate.

The operation of the improved nut will be evident. The plug 16 will be screwed into the nut a sufficient distance to engage the outer end of the axle in such manner as to prevent any longitudinal movement between the axle and the axle-box, but at the same time not to cause undue friction on the ends of the axle-box, and it is obvious that as the axle-box becomes shortened from wear the plug can be set back in the nut to permit the nut being screwed up on the axle to compensate for the shortening of the axle-box. To lock the plug by means of the key, said plug will be turned in the nut until one of its grooves 17 registers with the groove 19 to form a keyway. The key 18 will then be fitted into such keyway and the retaining-screw 21 screwed into the opening 22. In the construction shown in Fig. 4 one of the grooves 17 is arranged directly beneath the end of the set-screw 24, which is then seated in the same. By these means the plug is securely locked in place and cannot be turned until the locking device has been withdrawn from the slot.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having now described my invention, what I claim as new, and desire to secure by Letters Patent, is—

1. In a hub-attaching device, the combination with a nut having a screw-threaded opening adapted to receive in its inner end, the end of the axle-spindle, of a screw-threaded plug operating in the outer end of said nut-opening and adapted to abut against the end of the axle, and separate locking means engaging both the nut and the plug to hold them in relatively fixed position.

2. In a hub-attaching device, the combination with a nut having a screw-threaded opening adapted to receive in its inner end, the end of the axle-spindle, of a screw-threaded plug operating in the outer end of said opening and adapted to abut against the end of the axle-spindle, said nut being provided in its screw-threaded face with a plurality of longitudinal notches, and locking means carried by the nut and adapted to engage the notches of the plug to hold said nut and plug in relatively fixed position.

3. The combination with an axle, of an axle-nut provided with a groove intersecting its threads, a threaded plug arranged within and closing the outer end of the nut and provided with a groove intersecting its threads and adapted to register with the groove of the nut to form a keyway, and a key fitting in the keyway and engaging the plug and the nut and provided at its outer end with a washer arranged on and secured to the outer face of the plug, substantially as described.

4. The combination with an axle and axle-nut, of a threaded plug adjustably secured in the outer end of the threaded opening in the said nut, said plug and threaded opening having grooves intersecting their threads and adapted to register to form a keyway, and said plug having a threaded opening extending centrally and longitudinally thereof, a washer adapted to seat on the end of the plug with its opening registering with said threaded opening in the plug, a key integral with the washer to fit in said keyway, and a screw fitted in the threaded opening in the plug to lock the washer and key in position, substantially as described.

In testimony that I claim the foregoing as my own I have hereto affixed my signature in the presence of two witnesses.

CHRISTIAN HEILRATH.

Witnesses:
GOTTLOB FAIG,
HENRY SULLIVAN.